(12) United States Patent
Hughes et al.

(10) Patent No.: US 8,621,934 B2
(45) Date of Patent: Jan. 7, 2014

(54) DUAL-AXIS RESONANCE TESTING OF WIND TURBINE BLADES

(75) Inventors: Scott Hughes, Lakewood, CO (US); Walter Musial, Boulder, CO (US); Darris White, Port Orange, FL (US)

(73) Assignee: Alliance for Sustainable Energy, LLC, Golden, CO (US)

(*) Notice: Subject to any disclaimer, the term of this patent is extended or adjusted under 35 U.S.C. 154(b) by 359 days.

(21) Appl. No.: 12/747,458

(22) PCT Filed: Dec. 9, 2008

(86) PCT No.: PCT/US2008/086027
§ 371 (c)(1),
(2), (4) Date: Jun. 10, 2010

(87) PCT Pub. No.: WO2009/097049
PCT Pub. Date: Aug. 6, 2009

(65) Prior Publication Data
US 2010/0263448 A1    Oct. 21, 2010

Related U.S. Application Data

(60) Provisional application No. 61/013,674, filed on Dec. 14, 2007.

(51) Int. Cl.
*G01N 3/32* (2006.01)
(52) U.S. Cl.
USPC .......................................................... 73/808
(58) Field of Classification Search
USPC .......................................................... 73/808
See application file for complete search history.

(56) References Cited

U.S. PATENT DOCUMENTS

| 4,519,053 A | 5/1985 | Bedenbender et al. |
| 4,924,706 A * | 5/1990 | Moore ............................ 73/579 |

(Continued)

FOREIGN PATENT DOCUMENTS

WO    2004 005879    1/2004

OTHER PUBLICATIONS

Intl Search Report dated Oct. 1, 2009, for Intl Application No. PCT/US08/86027.

(Continued)

*Primary Examiner* — Lisa Caputo
*Assistant Examiner* — Octavia Davis-Hollington
(74) *Attorney, Agent, or Firm* — W. LaNelle Owens; Paul J. White; John C. Stolpa (57) ABSTRACT

An apparatus (100) for fatigue testing test articles (104) including wind turbine blades. The apparatus (100) includes a test stand (110) that rigidly supports an end (106) of the test article (104). An actuator assembly (120) is attached to the test article (104) and is adapted for substantially concurrently imparting first and second forcing functions in first and second directions on the test article (104), with the first and second directions being perpendicular to a longitudinal axis. A controller (130) transmits first and second sets of displacement signals (160, 164) to the actuator assembly (120) at two resonant frequencies of the test system (104). The displacement signals (160, 164) initiate the actuator assembly (120) to impart the forcing loads to concurrently oscillate the test article (104) in the first and second directions. With turbine blades, the blades (104) are resonant tested concurrently for fatigue in the flapwise and edgewise directions.

17 Claims, 5 Drawing Sheets

(56) References Cited

U.S. PATENT DOCUMENTS

| | | |
|---|---|---|
| 5,425,276 A | 6/1995 | Gram et al. |
| 6,023,980 A | 2/2000 | Owen et al. |
| 7,953,561 B2 * | 5/2011 | Musial et al. .................... 702/42 |
| 8,505,387 B2 * | 8/2013 | Waggot et al. ................. 73/808 |
| 2006/0037402 A1 | 2/2006 | Musial et al. |

OTHER PUBLICATIONS

Written Opinion of the Intl Search Report dated Oct. 1, 2009, for Intl Application No. PCT/US08/86027.

* cited by examiner

DUAL-AXIS RESONANCE TESTING OF WIND TURBINE BLADES

CROSS-REFERENCE TO RELATED APPLICATIONS

This application claims the benefit of U.S. Provisional Application No. 61/013,674, filed Dec. 14, 2007, which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

For a wind turbine designer, one of the most crucial tasks is creating a blade design that allows a turbine connected to these blades or the rotor to effectively convert wind into electricity. The blades must also be designed properly to withstand inertial forces, aerodynamic forces, and structural forces so as to provide a relatively long service life and safe operation. Like all rotating machines, wind turbines are generators of fatigue, and every revolution of its components including the turbine blades produces a load or fatigue cycle, with each of these cycles causing a small, finite amount of damage that eventually may lead to fatigue cracks or other failures. Modeling may be used in some cases to determine service life of a turbine blade during normal operations. However, modeling has its limitations, including variations in the as-built/manufacture blade and a design and the difficulty in accurately modeling operational conditions with varying and sometimes random loading. As a result, wind turbine blades are typically laboratory tested to determine that their fatigue strength or characteristics are adequate for a desired service life.

Presently, wind turbine blades are fatigue tested in the flapwise direction (i.e., out of the rotor plane or in a direction transverse to a plane extending through the blade) and in the edgewise direction (i.e., in the plane of rotation or in a direction parallel to a plane extending through the blade). For large blades (e.g., greater than 40-meter blade lengths) these two fatigue tests (e.g., two single axis tests) are typically run sequentially, and, to simulate a typical service life of a blade, each test may involve placing a blade through 1 million to 10 million or more load or fatigue cycles, which may take 3 to 12 months or more to complete for each tested direction. There is a trend for wind generator systems to become increasingly larger. Unfortunately, however, the larger blades associated with larger wind generator systems are subjected to greater static and dynamic loads and the facilities required to test these larger blades are also very large as newer generation turbine generators being designed with blades 40 meters or more in length. It is very desirable, and often necessary, to test in advance a proposed blade design to ensure that the design is capable of withstanding the expected loads without structural failure and to evaluate the fatigue resistance of the blade design. The test equipment can also be relatively expensive to purchase and operate. Hence, there is a need for blade testing techniques that are less expensive to use and require less time to complete while still providing accurate fatigue testing results.

As further background on laboratory testing, wind turbine blades are tested by applying loads to the blade in various directions. For example, one type of load is applied in a direction perpendicular to the longitudinal or long axis of the blade and is often referred to as a bending load or as a flap load in the wind turbine field. Another type of load is also applied in a direction perpendicular to the longitudinal axis but also perpendicular to the direction of the applied bending or flap load in order to assess the structural properties of the blade in the transverse or rotational direction. Such loads are often referred to as transverse or lead-lag loads. The load applied to the blade in a given direction may be time-invariant or "static." Alternatively, the load may be made to vary with time in which case the load is often referred to as "cyclic." Static loads are generally useful in evaluating the stiffness and ultimate strength of the blade whereas cyclic loads are generally useful in evaluating the fatigue resistance of the blade.

Several different types of test systems have been developed and are being used to apply loads to wind turbine blades. One type of test system uses a linear hydraulic actuator to apply the desired loads to the blade. This type of apparatus is advantageous in that it can be used to apply loads in any desired direction by simply mounting the hydraulic actuators at the desired positions on the blade and by orienting the actuators in the appropriate directions, e.g., for sequential flapwise and edgewise testing. More recently, a resonance test system has been designed and used that provides a resonant actuator for applying loads in the flapwise direction and at the resonant or natural frequency of the test system in the flapwise direction. Since the loading apparatus is attached directly or through compliant linkages to the blade, the test system natural frequency is typically lower than the blade natural frequency, thus the fundamental frequencies of the test system (e.g., blade with hardware) are referred to. Concurrently, in some cases, a transverse load is applied (e.g., a load in the edgewise direction) to the edge of the blade at an offset station to load the blade in the edgewise direction at the same time as the blade is loaded in the flapwise direction to better simulate actual operating loads and hasten testing. However, the transverse load has typically been applied with a forced displacement device with a bell crank or similar device that is attached to the ground plane to provide oscillation in the edgewise or transverse direction. The oscillation in the transverse direction has, to date, been provided at the same frequency used for the actuator applying a flapwise load (e.g., both loads are input at the resonant frequency of the test system in the flapwise direction), and the design of the forced displacement device has limited capability due to the large oil flow, if utilizing hydraulic systems, and displacement requirements. As a result, such fatigue testing systems are possible but may be limited by practical constraints for larger blades (e.g., blades over 40 meters) in which flapwise displacement may be quite large such as up to 6 meters or more.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Briefly, a dual-axis resonant test system is provided for concurrently testing wind turbine blades and other elongate test articles in two directions such as the flapwise and edgewise directions of a blade. The test system includes an oscillating or actuator assembly that is mounted to the blade at a distance from the root, which is semi-rigidly mounted to a test stand or fixture. The cantilevered blade then is fatigue tested by operating the oscillating assembly to impart a forcing function in the flapwise direction and a forcing function in the edgewise direction to cause the blade to concurrently oscillate (or be displaced) principally in both the flap and edge directions. The forcing function in this context is the external load imparted by the oscillating assembly. The oscillating assembly may include, for example, a flapwise actuator that is operated to provide the forcing function in the flap direction by operating at a controller provided amplitude at or near the resonant frequency of the test system in the flapwise direction. The oscillating assembly further may include an edgewise actuator that is operated to provide the forcing function in the edge direction (e.g., a direction transverse and typically orthogonal to the flapwise direction) by operating at a controller-provided amplitude at or near the resonant frequency of the blade in the edgewise direction (which typically differs from the resonance in the flapwise direction). The controller may process feedback signals from sensors mounted on the blade to determine loads or bending moments on the blade in the flap and edge directions, store these moments, track/count the cycles, and also provide adaptive displacement signals with amplitudes to the flapwise and edgewise actuators to maintain the applied loads within a desired load or test envelope (e.g., the dual-axis testing may involve a load that varies over time or between cycles but that is controlled to fall within an acceptable envelope and this concept may be considered quantum blade testing).

The dual-axis resonant test method can be applied to any length of turbine blade, but, more particularly, an apparatus is provided for fatigue testing elongate test articles including wind turbine blades such as larger blades over 40 meters or the like. The apparatus includes a test stand that is used to at least semi-rigidly support an end of the test article. An actuator assembly is attached to the test article at a distance from the supported end. The actuator assembly is adapted for substantially concurrently imparting a first forcing function (e.g., a first external load) in a first direction on the test article and a second forcing function (e.g., a second external load) in a second direction on the test article, with the first and second directions being transverse (e.g., relatively perpendicular) to a longitudinal axis and transverse to each other. The principal directions of the external force are not required to be oriented in the same direction as the blade response. The directions of both the flapwise and edgewise motions are natural motions which include a complex compound path. A controller or control system is also provided that transmits a first set of displacement signals to the actuator assembly at a first resonant frequency of the test system and a second set of displacement signals to the actuator assembly at a second resonant frequency of the test system. The first and second sets of displacement signals act to initiate the actuator assembly to impart the first and second forcing functions so as to concurrently oscillate the test article in the first and second principal directions, respectively. While dual-axis loading may be provided by using independent actuators and masses to apply flap and edge loads in some embodiments, other embodiments may employ a single mass connected to the blade through two actuators which allow the mass to apply both a flapwise and edgewise force.

The test article may be a wind turbine blade, and the first resonant frequency may be the resonant frequency of the blade in the flapwise direction while the second resonant frequency may be the resonant frequency of the blade in the edgewise direction. In this manner, the test apparatus may operate at two differing fundamental or resonant frequencies. The first set of displacement signals may include a first amplitude and the second set of displacement signals may include a second amplitude that differs from the first amplitude. The actuator assembly may include one or more actuators for applying a load or forcing function in the first direction in response to receiving the first set of displacement signals and one or more actuators for applying a load or forcing function in the second direction in response to receiving the second set of displacement signals, with such sets of signals being in phase or out of phase (e.g., the edgewise displacement signals may lag such as by 90 degrees from the flapwise displacement signals). The phase angle between the flapwise and edgewise control signals and blade response are allowed to vary throughout the test duration.

Sensors such as strain gauges, displacement transducers and/or accelerometers may be mounted upon the test article and provide blade response or feedback signals to the controller. The controller may process these sensor signals to determine bending moments in the first and second directions of the test article (e.g., the flapwise and edgewise moments occurring due to displacement of the test article from its at rest position). The controller may compare bending moments with boundary values that define an acceptable load or test envelope and the controller may adaptively adjust the amplitude or phase parameters in the displacement signals transmitted to the actuators to maintain or return loading on the test article to flapwise and edgewise bending moments within the test/load envelope. The transmittal of a pair of displacement signals (which may be provided in a single signal with two distinct frequencies) may be associated with a single fatigue or load cycle for the test article, and the controller may track or count the cycles applied by the actuators along with determined/measured bending moments at each cycle.

In some cases, the controller is operable to perform fatigue testing on the test article accounting for final damage accumulation in flap and edge bending for a predetermined number of stress cycles, the fatigue testing being performed over a load history time series free of accurate control over each load cycle and over phase angle. It is anticipated that in some applications dual-axis resonance testing may not be controllable with the same level of accuracy as single axis testing on a cycle-to-cycle basis. However, wind turbines experience extreme vulnerability as a rule anyway. Hence, a goal using this method may be to not control the magnitude of each cycle as is done in a standard constant amplitude test but to instead control the total damage that is the result of many (e.g., millions) of cycles. No single load cycle has a significant impact on the damage, and, as a result, the damage can be adjusted by controlling the trends of the fatigue load cycles and making small real-time adjustments to keep the trajectory aimed at the target.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

The following provides a description of exemplary methods and systems for fatigue testing wind turbine blades concurrently in the flapwise (or out of the rotor plane) and the edgewise (or in the rotor plane) directions. In prior blade testing, fatigue in these two directions or axes of the blade were performed independently or concurrently with forced displacement methods, and, hence, the methods and systems described herein as performing both tests simultaneously significantly reduce the time required for blade fatigue testing and reduce associated costs such as the amount of energy while increasing test accuracy and freeing up facilities for additional testing. Generally, the methods and systems implement the concept of exciting a test article or specimen such as a wind turbine blade in the flapwise direction at the test system's flapwise resonance while concurrently or simultaneously (or at least during the same test period) exciting the test article or blade in the edge direction at the test system's edge resonance (and not simply at the same frequency as used for the flapwise direction).

A number of oscillating systems may be used to provide the concurrent or dual-axis excitation of the test article or wind turbine blade (with "blade" being used from hereon for ease of explanation). Generally, the oscillating systems may include one or more actuators or other devices for imparting both the flap and the edge forcing functions in a controlled manner (e.g., at the edge and flap resonant frequencies of the test system). For example, the oscillating system may provide one or more flapwise actuators and one or more edgewise actuators that are attached at the same or differing locations or stations along the length of the blade and are operated by a control system with displacement signals provided at natural frequencies (e.g., constant amplitude sinusoidal displacement signals at the same or more typically at differing amplitudes to simulate in-use or a predefined loading condition). These actuators may be provided, but are not limited to, via an augmented Universal Resonant Excitation (UREX) system such as by using the two flapwise actuators of a typical UREX system and adding an edgewise actuator or edge mounted UREX to provide the edge forcing function. Other hardware embodiments may include multiple flapwise and edgewise actuators at multiple distinct spanwise blade stations.

In other implementations, the blade is excited in the flapwise direction using a Blade Resonance Excitation (BREX) system, which is described in U.S. Patent Application Pub. No. 2006/0037402, which is incorporated herein by reference in its entirety. In such an implementation, the blade may be concurrently excited in the edgewise direction using an Edge Resonance Excitation (EREX) system that may be BREX system applied to a blade to provide a forcing function in edgewise direction with or without modification. In other applications, the oscillating system utilizes a single actuator, such as a BREX-type system, to provide both forcing functions. This may be achieved, for example, by providing a displacement signal at an oscillating frequency composed of two distinct frequencies, e.g., a flap carrier signal with a riding edge frequency or the like.

With all of these oscillating systems, the two resonances of the tested blade occur at different frequencies unless external damping or spring elements are attached to the blade. Thus, the combined motion of the blade may be coupled or random in nature and practice. An objective of the combined or dual-axis test is to fatigue each location around the profile of the blade to an appropriate accumulation (e.g., a particular number of counted load or fatigue cycles). With independent flap and edge fatigue tests, it had typically only been possible to properly fatigue the blade at two locations (e.g., one location for each blade test). However, by combining the flap and edge loading as part of a single fatigue test, use of the methods and systems described herein allows simulation of realistic loading conditions at multiple locations around the perimeter and span of the blade. Dual-axis testing may result in the cycle behavior not being precisely controlled due to changing temperatures and blade properties but the testing results in the imparted load on the blade having differing values that are kept within a test or load envelope, e.g., load level is permitted to vary within an envelope of prescribed boundaries (which may be thought of as "quantum blade testing"). The load or test envelope may be adaptively adjusted as part of the initial test calibration and configuration such that desired load targets are within this load envelope and are met after a particular number of cycles.

Figure 1:
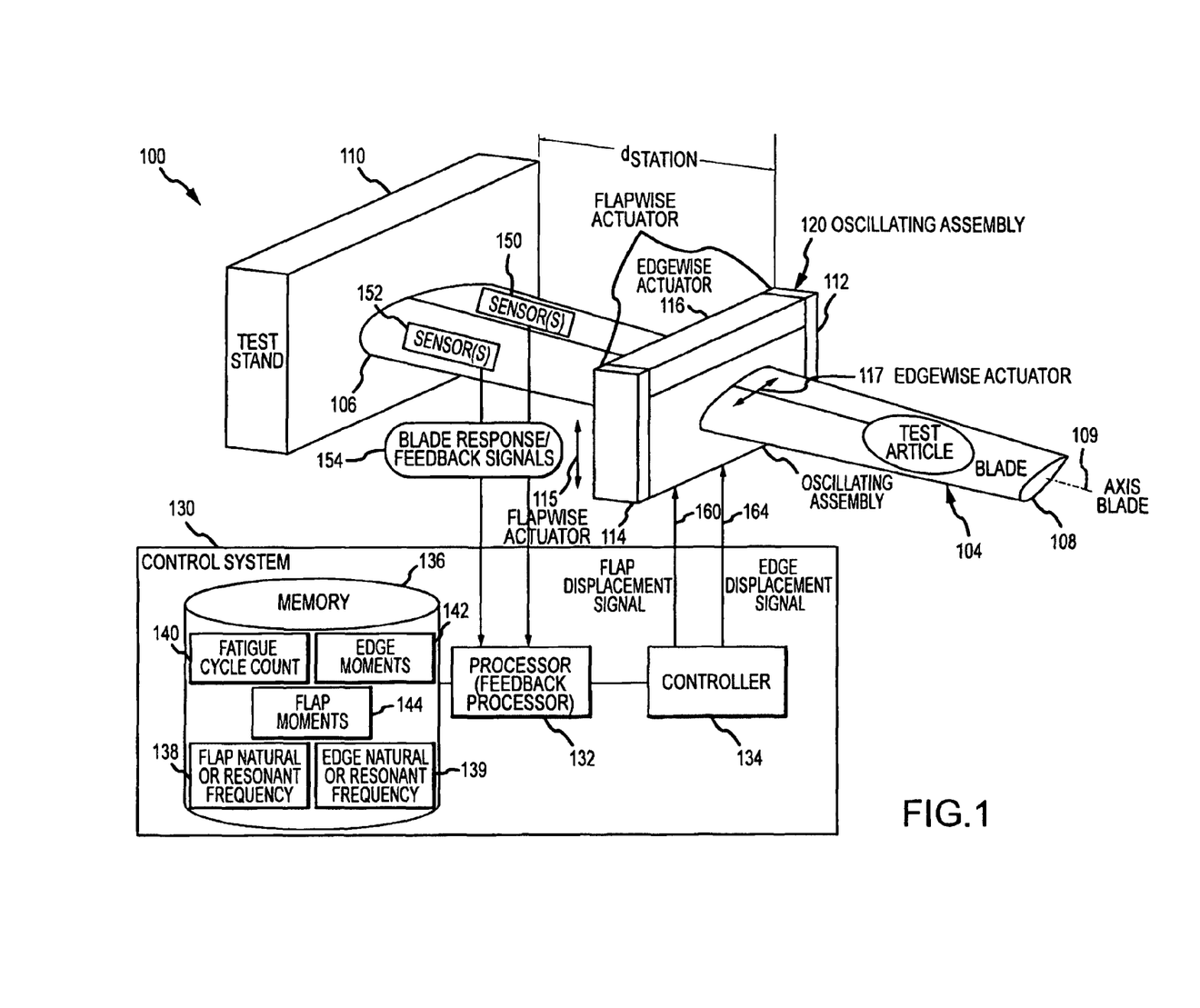
FIG. 1 illustrates in schematic and functional block form a dual-axis resonant test system for use in load and/or fatigue testing a test article or specimen such as a blade for a wind turbine, with the test system being adapted to impart both flap and edge forcing functions concurrently and at the corresponding resonant or natural frequencies (e.g., the blade's flapwise resonance and edgewise resonance rather than simply at the flapwise resonance for both inputs)

FIG. 1 illustrates in schematic and functional block form a dual-axis resonant test system of one embodiment to concurrently perform fatigue testing of a wind turbine blade in the flapwise and edgewise directions. The system 100 includes a test stand 110 for retaining a test article such as blade 104 in a cantilevered arrangement with the root end 106 of the blade semi-rigidly affixed to the test stand 110 and the blade 104 extending outward with its tip end 108 being unrestrained along its length or along the longitudinal axis, $axis_{blade}$. The blade 104 may be nearly any blade design with the test system 100 being particularly well suited for use with larger blades such as those in use in 1.5 Megawatt and larger wind turbines, e.g., 40 meter and larger blades being typical. The larger blades are more easily tested with the system 100 because edgewise testing is performed with an oscillating system 120 that is not mounted to a ground plane, which allows the system to handle larger blade displacements (e.g., up to 6 meters or more with some larger blades that are oscillated at the flap resonance). The system is well suited for testing blades with large sensitivities to transverse displacements or rotations such as swept planform or bend-twist coupled blades as the method is not restricted by geometric load effects from ground-plane referenced forcing loads.

The system 100 includes an oscillating assembly 120 for providing forcing functions in the flapwise and edgewise directions of the blade 104. The oscillating assembly 120 may take a number of forms to provide the dual-axis forcing functions. For example, an actuator may be provided to excite the blade 104 in the flapwise direction (e.g., transverse or orthogonal to a plane extending generally between the leading and trailing edge of the blade 104 and containing the longitudinal blade axis 109 or out of plane) and an actuator may be provided to excite the blade 104 in the edgewise direction (e.g., in a direction transverse to the blade axis 109 or in the blade plane). These two actuators may be provided at differing stations or locations along the length of the blade 104 such as with differing station distances, $d_{station}$, as measured from the test stand 110 or root end 106 of the blade 104. Alternatively, as shown and used in the prototype test system discussed below, the oscillating assembly 120 may include one or more flapwise actuators 112, 114 (with two being shown in the system 100 as an example but not a limitation) and an edgewise actuator 116 that are mounted at the same blade location/station (i.e., at approximately the same station distance, $d_{station}$). The flapwise actuators 112, 114 are operated by a control system 130 to excite the blade 104 to move or oscillate as shown at 115 in the flapwise direction by applying forces out of the rotor plane (e.g., orthogonal to the blade plane) and at the flap natural frequency of the test system 104. Concurrently (or during the same operating or test period), the edgewise actuator 116 is operated by the control system 130 to excite the blade to move or oscillate as shown at 117 in the edgewise direction by applying forces in the rotor plane (e.g., parallel to or coplanar with the blade plane) and at the edge natural frequency of the test system 104. Typically, the flap and edge resonant frequencies differ such that edge and flap forcing functions use two differing frequencies, but, in some embodiments, these two frequencies may be substantially the same (e.g., by applying weights, damping elements, spring elements, or static loads to the blade to force the two frequencies to match). The actuators 112, 114, 116 may be hydraulic or other types of actuators to provide the desired oscillations 115, 117 such as the actuators provided in a UREX system modified to include an edgewise actuator.

A control system 130 is provided in the test system 100 with a processor or feedback processor 132 a controller or control module (e.g., a PID controller or the like) 134. Memory 136 is provided that stores test parameters and measured and/or determined test data. This stored data may include determined a flap natural or resonant frequency 138 and an edge natural or resonant frequency 139, with these values being used by controller 134 for use in timing the transmittal of corresponding flap displacement signals 160 and edge displacement signals 164 to the oscillating assembly 120 to operate the flapwise actuators 112, 114 and edgewise actuator 116. The stored data may also include a tabulation or count of the number of load or fatigue cycles 140 that have been imparted during operation of the system 100 to fatigue test the blade 104. Yet further, the stored data may include loads or moments for the edge and flap 142, 144 such as may be measured by sensors such as strain gauges or as may be determined based on calibrations of accelerometers or other transducers. Although not shown, the control system 130 may further include software for displaying or outputting the data in memory 136 such as in table or graph form and for performing desired calculations such as determining moments 142, 144 from accelerometer output signals (e.g., signals 154 or the like).

Sensors 150, 152 are provided on the flap and edge portions of the blade 104 and output blade response/feedback signals 154 that are processed by the feedback processor 132 for use in operating controller 134 to transmit flap displacement and edge displacement signals 160, 164 to operate the actuators 112, 114, 116 of oscillating assembly 120 to maintain the loads applied to the blade 104 within a predefined test or load envelope (e.g., within predefined maximum loads/blade bending moments) and/or to maintain displacements of the blade 104 within a desired displacement envelope (e.g., within predefined maximum flapwise and edgewise displacements). For example, the signals 160, 164 may have amplitudes that are set by the controller 134 in response to determinations by the processor 132 of the moments experienced by the blade in the edgewise and flapwise directions based on feedback signals 154 from sensors 150, 152. The signals 160, 164 are transmitted the flap and edge natural frequencies 138, 139 in phase or more typically with a variable phase offset (e.g., such as a 90 degree lag for the edge displacement signal 164).

A prototype of the system 100 was implemented to demonstrate the aspects of a dual-axis resonant test method. In this test run of the prototype system 100, the test article 104 was a 9-meter blade, and one purpose of the test was to demonstrate the ability to concurrently impart independent flapwise and edgewise fatigue loads on a wind turbine blade 104 using resonant techniques. The 9-meter blade 104 was attached to a test stand 110 and an oscillating assembly 120 made up in part of a UREX system with a pair of hydraulic exciters or actuators 112, 114 was attached with a saddle mount to the blade 104 at distance, $d_{station}$, from the stand 110 to provide flapwise excitation forces. To apply the edgewise excitation forces, an actuator 116 was rigidly attached to the UREX frame with the hydraulic actuator aligned substantially parallel to the blade plane (e.g., to provide an in-plane forcing function). The augmented UREX system or oscillating system 120 was found able to independently apply flapwise and edgewise resonant loads to the blade 104, e.g., to cause oscillations 115 and 117 in the flap and edge directions at about the resonance of the blade in those two directions. The oscillating system 120 was placed at 1.6-meter station (e.g., the distance, $d_{station}$, from the test stand 110 or root plane 106 was about 1.6 meters) but this location may be varied to implement a dual-axis resonant test.

In addition to tuning/modifying the station used for system 120, it may be desirable to provide additional ballast weights with the oscillating assembly 120 (e.g., in or attached to the UREX saddle) or separately at various locations along the length of the blade 104 such as with a ballast saddle or the like. In the prototype system 100, the weight of the oscillating assembly 120, which included the mounting saddle, the hydraulic actuators 112, 114, 116, and an oscillating mass (not shown in FIG. 1), was about 700 kilograms. A ballast saddle (not shown in FIG. 1) was located at the 6.75-meter station with a mass of about 180 kilograms. Again, the locations of the UREX-based system 120 and the ballast saddle are only exemplary and are not limiting of the dual-axis resonant testing method. Additionally, it is not a necessary condition that the flapwise and edgewise actuators (i.e., the forcing functions) are collocated at the same spanwise station as shown in FIG. 1.

Strain gages (e.g., sensors 150, 152) were installed on the blade 104 in the prototype of system 100 at or near the 10%, 25%, and 50% spanwise stations. These stations were selected as being useful for monitoring the bending moment of the blade 104 as measured along the span or length of the blade 104. Strain gages were applied in sets at these stations with one gage or sensor positioned to primarily measure flapwise being moments (strain to moment calibration) with a second gage oriented or position primarily to measure edgewise moments.

Prior to running the fatigue test, the blade test system 100 was calibrated via two static load applications: one in the flapwise direction and one in the edgewise direction. A static load was applied while measuring the applied load and resulting strain output with the control system 130 (e.g., with strain gages or sensor 150, 152). A bending moment versus strain relationship was also established as part of this static loading calibration process. Results of the calibration in the prototype system 100 with the 9-meter blade 104 are shown in the following table:

TABLE

Strain Versus Moment Calibration

| Gage Name | Station [mm] | ue/Nm Flap | ue/nm Edge | FE Ratio |
|---|---|---|---|---|
| F6 | 680 | −0.020 | 0.003 | 6.0 |
| E6 | 680 | 0.012 | −0.085 | 0.1 |
| F25 | 2550 | −0.034 | 0.014 | 2.4 |
| E25 | 2550 | 0.018 | −0.049 | 0.4 |
| F45 | 4500 | −0.010 | 0.001 | 18.7 |
| E45 | 4500 | 0.002 | −0.008 | 0.2 |

The FE ratio provides the cross-axis sensitivity between flap and edge with higher values (e.g., greater than 20) being preferred. From the table, it is evident that there is a substantial coupling between the flap and edge directions. This coupling is an artifact of the gage location. In a more ideal case, edgewise gages are insensitive to flapwise loading, with flapwise gages located to be insensitive to edge loads.

During test execution, the blade system 100 was driven by the flapwise and edgewise actuators 112, 114, 116 of oscillating system 120. Control was accomplished via the control system 120, which in this test included MTS hydraulic controllers. Initially, independent tests were conducted including first exciting the blade in the flapwise direction and then exciting the blade in the edgewise direction only. The fundamental flapwise frequency was determined as 2.5 Hertz (Hz), and the 3.5 Hz for the fundamental edge frequency. For the dual-axis resonant test, both actuators were run concurrently with the flapwise actuator 112, 114 applying a sinusoidal forcing function which was initially 90-degrees ahead of the edgewise actuator 116 (e.g., the displacement signals 160, 164 have are out of phase by about 90 degrees but, it should be noted, that the lag or out-of-phase value is set at the beginning of a test but varies during the test).

Strain signals were recorded as time series, with the frequencies 138, 139 and moments 142, 144 being stored in memory 136 by controller 132. In other embodiments, the sensors 150, 152 include accelerometers that are calibrated for bending moment determination or their response 154 to particular being moment during initial run with strain gages 150, 152. Then during the test with system 100, the accelerometers 150, 152 are used to provide the blade response/feedback signals 154 that are processed by the processor 132 to determine edge and flap moments 142, 144. Accelerometers or other transducers may be preferred for the dynamic testing as they are more reliable for unattended testing of a blade 104 through numerous cycles (1 to 10 million or more) over a long period of time (up to 3 to 12 months or more) whereas strain gages are accurate but tend to vary with temperature and often fail or require maintenance.

Figure 2:
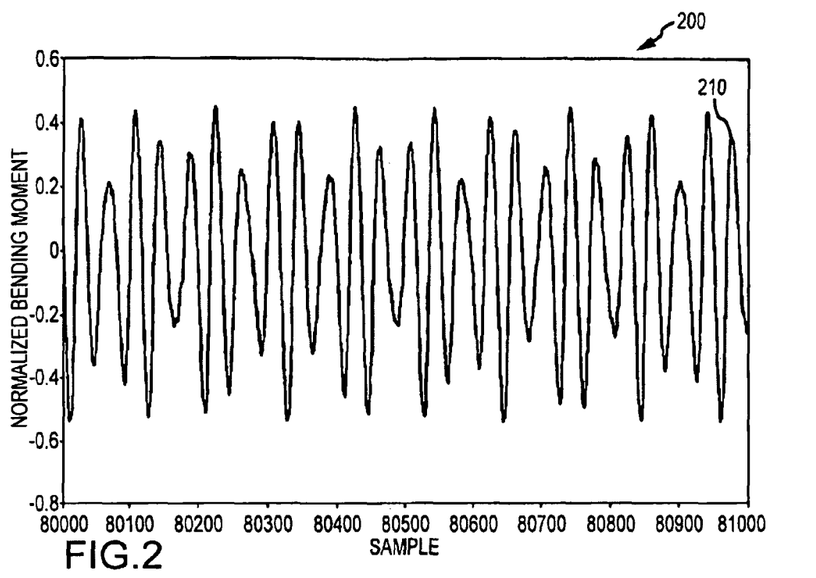
FIG. 2 is a graph illustrating normalized edgewise moments measured or determined during operation of a prototype of a dual-axis resonant test system such as the system of FIG. 1 to field test a turbine blade by oscillating the blade in the flap and edge direction concurrently (or at least during the same test period)

FIG. 2 illustrates a graph 200 providing the measured/determined and normalized edgewise moment 210 at various load or fatigue cycles. The graph 200 illustrates the moments 142 recorded during the operation of the system 100 with the 9-meter blade 104 with line 210. The variation in the magnitude of the edgewise moment from fatigue cycle-to-fatigue cycle is of interest, with this behavior being expected due to the "quantum" behavior of the dual-axis resonant test method. The edge response is composed of both flap and edge components, and the peak and valley data from this channel exhibit a "beat" frequency.

Figure 3:
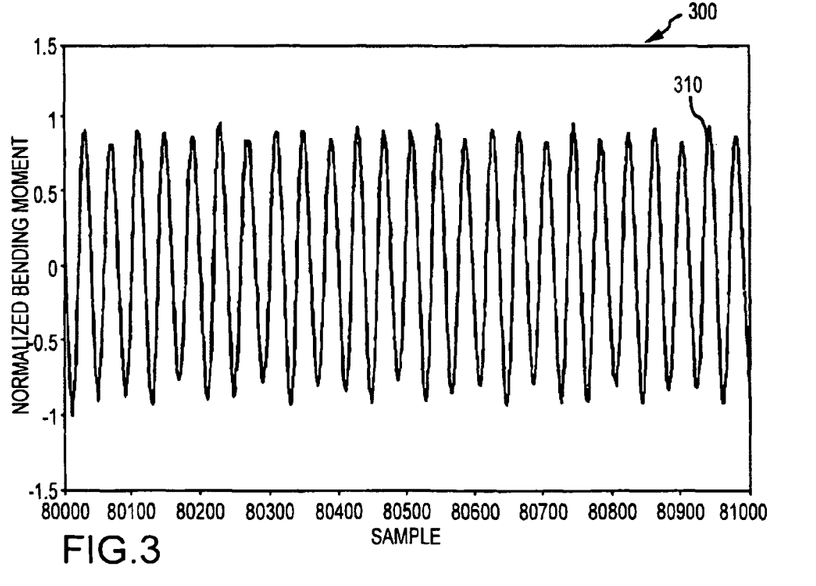
FIG. 3 is a graph illustrating normalized flap bending moments measured or determined by operation of the prototype dual-axis resonant test system used to apply the moments shown in the graph of FIG. 2 on a turbine blade.

FIG. 3 illustrates a graph 300 providing the measured/determined and normalized flapwise bending moment 310 at various load cycles. The graph 300 illustrates the moments 144 recorded during the operation of the system 100 with the 9-meter blade 104 and use of a UREX-based oscillating system 120 attached to the blade 104 to concurrently provide the flap and edge forcing functions. In other words, graph 300 provides a time history of the normalized flapwise bending moment imparted by oscillating system 120 on blade 104. The variation in cycle-to-cycle peaks is much tighter (or smaller) than found for the edgewise moment 210 in graph 200. This is to be expected as the flapwise input forces and resulting bending moments are higher, and less sensitive to cross-talk, for the flap direction.

Figure 4:
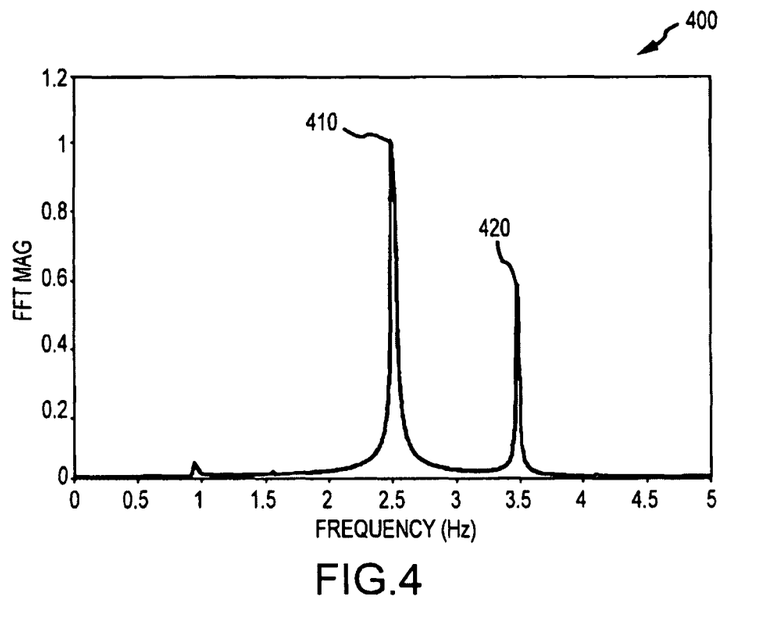
FIG. 4 provides frequency response of a strain gage signal positioned on the edge of a turbine blade during laboratory testing of a prototype dual-axis resonant test system (i.e., the test system used to produce the moments shown in FIGS. 2 and 3)

FIG. 4 illustrates a graph 400 of the frequency response during dual-axis fatigue testing or excitation. The data used to generate graph 400 was taken from the dual-axis time series data during the fatigue load test, and the graph 400 shows a peak 410 at the fundamental flap frequency (2.5 Hz) and a peak 420 at the fundamental edge frequency (e.g., 3.5 Hz). Generally, graph 400 provides the frequency response of the edge strain gage signal (or other sensor). It is evident from this frequency response function that the applied strain and, thereby, bending moment in the edge direction contains frequency content from both the flapwise and edgewise excitation. From all the data generated from the dual-axis resonant testing of the 9-meter blade 104 with the UREX-based prototype of system 100, the tested blade 104 responded as anticipated and desired by the inventors for resonant fatigue testing of turbine blades including a response with distinct flapwise and edgewise moment components that can be readily measured (and recorded 142, 144) and retained within a predefined/accepted load or test envelope.

Figure 5:
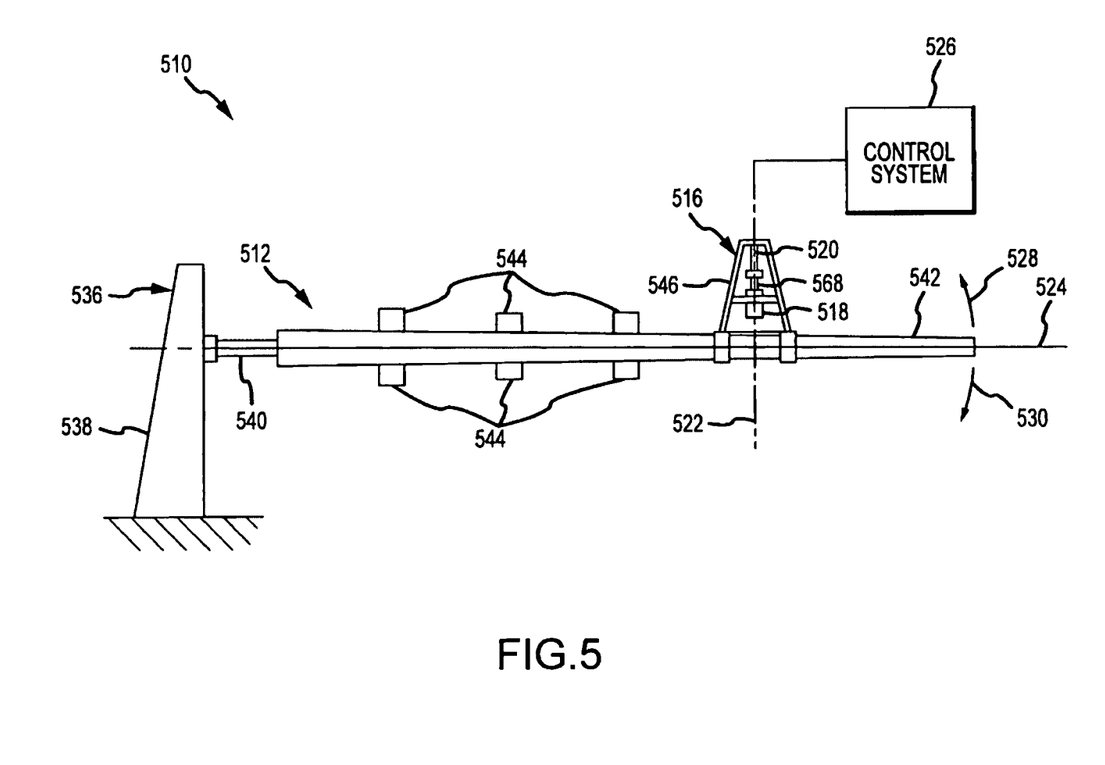
FIG. 5 illustrates a side view of a dual-axis resonant test system during a field test of a test article such as a wind turbine blade, with the test system configured to utilize an oscillating assembly with a single actuator to impart both the flap and the edge forcing functions on the test article.
Figure 6:
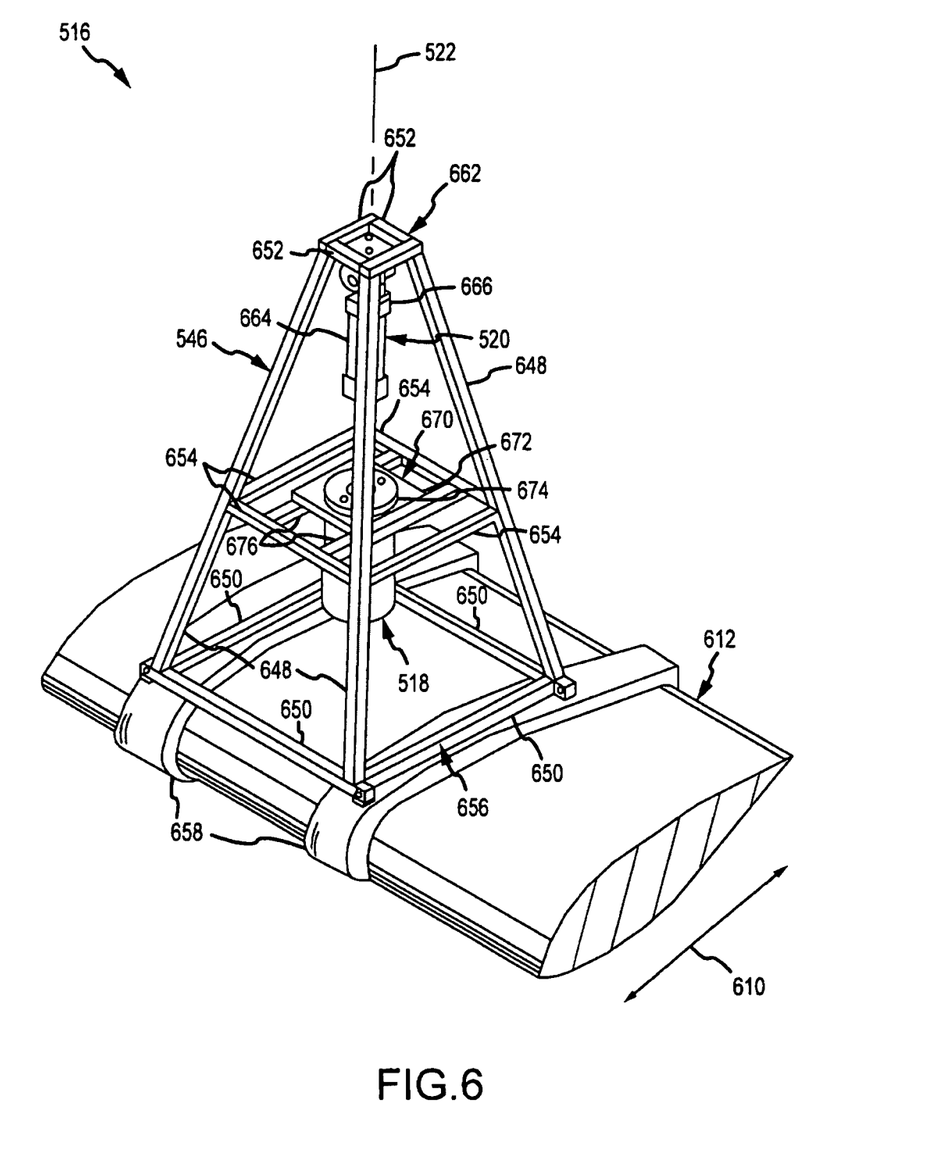
FIG. 6 illustrates a perspective, detailed view of the oscillating assembly of the test system of FIG. 5.

Another embodiment of a dual-axis resonant test system 510 is shown in FIGS. 5 and 6, and the system 510 is adapted to utilize an oscillation assembly with a single actuator to provide both flap and edge forcing functions to a wind turbine blade 512 (or other test article). System 510 includes a resonant actuator assembly 516, which in one embodiment is implemented as the BREX exciter assembly, as described in U.S. Patent Appl. Publ. No. 2006/0037402, which is incorporated in its entirety herein by reference. However, the actuator assembly 516 typically does not include a separate edgewise actuator operating at the flapwise resonant frequency but, instead, uses an oscillating frequency provided by the control system 526 composed of two distinct frequencies corresponding to the flap and edge resonant frequencies (e.g., with an actuator displacement signal to control operation of actuator assembly 516 that may be a flap carrier signal with a riding edge frequency or the like).

As shown, the actuator assembly 516 includes a mass 518 that is operatively associated with an actuator 520. The actuator 520 moves the mass 518 along a linear displacement axis or path 522 that is perpendicular to a longitudinal axis 524 of the wind turbine blade 14 and at least transverse to the blade plane containing the axis 524. A control system 26 operatively associated with the actuator 520 operates the actuator 520 to reciprocate the mass 518 along the linear displacement path 522 at an oscillating frequency including two a first frequency that is about equal to a resonance frequency of the specimen 512 (e.g., a wind turbine blade) in a test configuration in the flapwise direction and a second frequency about equal to a resonance frequency of the specimen 512 in the edgewise direction. The reciprocating mass 518 causes the wind turbine blade 512 to vibrate along the longitudinal axis 424, i.e., in the directions indicated by arrows 528 and 530 shown in FIG. 5 and directions indicated by arrow 610 as shown in FIG. 6. Such concurrent loading in the flapwise and edgewise directions results in the concurrent or simultaneous application to the blade 512 of both flap and edge bending moments or loads. The edgewise or transverse loads may also be referred to herein as transverse loads or "lead-lag" loads.

The system 510 may be operated as follows to place one or more structural loads on the specimen 512 under test. Assuming that a suitable specimen 512, such as a rotor or turbine blade, has been provided, the specimen 512 is mounted in a suitable test fixture 536. By way of example, in one embodiment, the test fixture 536 may include a rigid support or mount 538 for fixedly supporting the root end 540 of the blade 512. The oscillating or actuator assembly 516 is mounted to the blade 512 at a position intermediate the root 540 and tip 542 of the blade 512. It is generally preferred, but not required, to mount one or more static masses 544 to the blade 512. In one embodiment, the static masses 544 modify the loads applied to the blade 512 so that the blade loading will better approximate the expected in-service loads. At this point, the control system 526 may be activated to operate the resonant actuator system 516.

More specifically, the control system 526 operates the actuator 520 to reciprocate the mass 518 at a reciprocation or oscillating frequency made up of both the resonant frequency of the specimen 512 in the test configuration in the flapwise and the edgewise directions. The inertial loads placed on the actuator 520 by the reciprocating mass 518 are transferred to the blade 512, which results in the vibration of the blade along the longitudinal axis 524. That is, the blade 512 begins to be displaced in the directions indicated by arrows 528, 530, and 610. Since the oscillating frequency of the mass 518 is selected to include both resonant flap and edge resonant frequencies of the blade 512, the oscillating assembly 516 produces substantial deflections and resulting loads/bending moments of the blade 512 in the flapwise and edgewise directions.

One advantage of the system 510 is that it may be used to apply to the specimen 512 substantial deflections in the flapwise and edgewise directions with relatively low energy input. Also, the assembly 516 is not attached to ground so large displacements of the blade 512 are not a concern. Accordingly, the system 510 may be used to test sizable specimens 512 (e.g., wind turbine blades greater than about 40 meters) with high accuracy and without experiencing some of the drawbacks associated with non-resonant hydraulic test systems and single-axis resonant test systems (such as excessive pumping, actuator displacement, energy requirements, and time requirements). Another advantage is that the embodiments do not induce unwanted axial loads in the specimen 512, such as those associated with rotating mass resonant test systems. Other advantages are associated with its relative mechanical simplicity of the various systems and devices, and the fact that relatively small actuators may be used for actuator 520 to impart sizable deflections and loads to the specimen 512.

Having briefly described the apparatus 10 for applying structural loads to a specimen 12, as well as some of its more significant features and advantages, the various embodiments of the apparatus 10 will now be described in detail. However, before proceeding with the description, it should be noted that while the apparatus 510 is shown and described herein as it may be used to apply structural loads to a wind turbine blade 512, the present embodiments are not limited to use with any particular type of specimen 512. In fact, the present embodiments may be used to test any of a wide range of specimens 512 that are now known in the art or that may be developed in the future wherein it might be required or desired to place certain structural loads on the specimen 512 in accordance with the teachings herein.

With the foregoing considerations in mind, one preferred embodiment of system 510 for placing fatigue testing or dynamic loads on a specimen 512 is shown and described herein as it may be used to apply both flapwise and transverse/edgewise loads to a blade 512. The blade 512 extends along a longitudinal axis 424 and has a root end 540 and a tip end 542. The blade 512 may be of any conventional or yet-to-be developed design suitable for the intended application. The blade 512 may also be fabricated in accordance with conventional or yet-to-be developed techniques, as the case may be.

The blade 512 is affixed to a suitable support or test fixture 536 to allow the test system 510 of one embodiment to apply the desired resonant loads to the specimen 512. Any of a wide range of support or test fixtures 536 may be used to support the specimen 512 in a manner consistent with the desired purposes of the test, as would be obvious to persons having ordinary skill in the art after having become familiar with the teachings of the present embodiments. In one embodiment, the support or test fixture 536 includes a support mount 538 configured to fixedly receive the root end 540 of the blade 512 so that the root end 540 of blade 514 is rigidly or semi-rigidly supported thereby in a cantilevered manner.

The oscillating assembly 516 is used to vibrate the specimen 512 along the longitudinal axis 524 to deflect the specimen 512 in the flapwise and edgewise directions concurrently as indicated by arrows 528, 530, and 610. These deflections produce bending moments in the flap and edge directions in the specimen 512. The assembly 516 may be mounted at any convenient position along the longitudinal axis 524 of the specimen 512, e.g., at any convenient position between the root end 540 and the tip end 542 of the blade 512. Accordingly, the system 510 is not limited to any particular mounting location for the assembly 516. In one embodiment, the assembly 516 is mounted between about two-thirds to three-quarters of the span of the blade 512.

With reference now primarily to FIG. 6, the oscillating assembly 516 includes a load frame 546 configured to receive the reciprocating mass 518 and the actuator 520. The load frame 546 transfers to the specimen 512 the inertial loads generated by the reciprocating mass 518. Accordingly, the load frame 546 may include a wide range of structures and configurations suitable for this purpose. In one embodiment, the load frame 546 includes a pyramid-shaped structure having four support legs 648 connected at their lower ends by cross-members 650 and at their upper ends by cross-members 652. The support legs 648 are also supported by intermediate cross-members 654 located between the lower and upper cross-members 650 and 652, respectively. The lower end 656 of the load frame 546 may be provided with any convenient means for allowing the load frame 546 to be fixedly attached to the specimen 512. In one embodiment, the lower end 656 of load frame 546 is affixed to a pair of blade cuffs 658 (or a saddle mounting device) mounted to the blade 512. In the case of a UREX load apparatus only a single blade cuff is required. Alternatively, other attachment methods and devices may be used to secure the load frame 546 to the specimen 512.

The actuator 520 is mounted to the upper end 662 of the load frame 546 and is operatively associated with the mass 518 so that the mass 518 may be reciprocated along the linear displacement path 522. The actuator 520 may include a variety of actuators suitable for reciprocating the mass back and forth along the linear displacement path 522. In one embodiment, the actuator 520 includes a double-acting hydraulic actuator 664, the body end 666 of which is mounted to the upper end 662 of the load frame 546. The rod end 568 of hydraulic actuator 664 is connected to the mass 518. It is generally preferred, but not required, to provide a guide member 670 to the load frame 546 to assist in restraining the mass 518 so that the mass does not depart appreciably from the linear displacement path 522 as the mass is reciprocated. By way of example, the guide member 670 in one embodiment includes a plate 672 having a hole 674 therein sized to pass the mass 518. The plate 672 is mounted to the intermediate cross-members 654 via a pair of beams 676. Other alternative arrangements are also possible.

A method in which a single mass is connected to two actuators allowing a complex displacement path may also be used or considered. In such a case, the two actuators provide a displacement of the mass in an unlimited number of potential mass paths, thereby providing an external load in both the flapwise and edgewise directions.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope. An interesting aspect of the dual-axis resonant methods for testing blade fatigue is that the loads applied concurrently (or during a single test but out of phase by 90 degrees or the like so may be thought of as alternating loading but concurrent oscillation/displacement in flap and edge directions) are not constant. Instead, the amplitude of the displacement signals that are used to operate the flapwise and edgewise actuators (or a single actuator or different device providing both forcing functions) is held constant or adaptively changed to maintain the loading within a desired test or load envelope. In other words, the method described herein may be thought of as quantum blade testing in which the bending moment or loading on the blade and the phase angle between the flapwise and edgewise blade response is allowed to vary over the test cycles (such as to vary stochastically) such that loading in each direction varies within the envelope boundaries. Load control is loosened in the test to be within a range but over a test of numerous fatigue or load cycles the loading is expected to be statistically repeatable with the particular loading or load spectrum varying but loads falling within a predefined and acceptable range (e.g., keep blade deflection within a movement envelope and/or keep bending moments in each the flap and edge direction within desired bounds).

The invention claimed is:

1. An apparatus for fatigue testing elongate test articles, comprising:
a test stand at least semi-rigidly retaining an end of an elongate test article;
an actuator assembly attached to the test article, wherein the assembly is not attached to a ground plane, and adapted for imparting a first external load in a first direction on the test article and a second external load in a second direction on the test article, the first and second directions of the external loads being transverse to a longitudinal axis of the test article and transverse to each other; and
a controller transmitting a first set of displacement signals to the actuator assembly at a first resonant frequency of the test article and a second set of displacement signals to the actuator assembly at a second resonant frequency of the test article, wherein the first resonant frequency is about a resonant frequency of the wind turbine blade test system in a flapwise direction of the wind turbine blade and the second resonant frequency is about a resonant frequency of the wind turbine blade test system in an edgewise direction, the first and second sets of displacement signals initiating the first and second external loads applied by the actuator assembly to concurrently oscillate the test article in first and second directions, respectively, wherein the first set of displacement signals includes a first amplitude and wherein the second set of displacement signals includes a second amplitude differing from the first amplitude.

2. The apparatus of claim 1, wherein the elongate test article comprises a wind turbine blade.

3. The apparatus of claim 2, wherein the first resonant frequency differs from the second resonant frequency and the first direction is the flapwise direction of the wind turbine blade and the second direction is the edgewise direction of the wind turbine blade.

4. The apparatus of claim 2, wherein the wind turbine blade has a length as measured from a root end attached to the test stand to a tip end that is greater than about 40 meters.

5. The apparatus of claim 1, wherein the actuator assembly comprises a first actuator for applying a load in the first direction in response to the first set of displacement signals and further comprises a second actuator for applying a load in the second direction in response to the second set of displacement signals.

6. The apparatus of claim 5, wherein the controller transmits the first and second set of displacement signals out of phase with each other.

7. The apparatus of claim 1, further comprising sensors mounted on the test article, wherein the sensors transmit feedback signals to the controller.

8. The apparatus of claim 7, wherein the controller processes the feedback signals to determine bending moments, accelerations, forces, or deflections in the first and second directions for the test article, and wherein the controller compares the bending moments, accelerations, forces, or deflections with boundary values of an acceptable test load envelope and modifies an amplitude portion of the displacement signals in response to maintain or return loading on the test article to the acceptable test load envelope through any cycle counting and damage accumulation algorithms implemented by the user.

9. The apparatus of claim 8, wherein transmittal of one of the displacement signals from the first set and an associated one of the displacement signals from the second set corresponds to a single fatigue cycle and wherein the processor stores in memory a count of the fatigue cycles applied to the test article by the actuator assembly and stores the bending moments for each of the fatigue cycles in the memory.

10. The apparatus of claim 8, wherein the controller is operable to perform fatigue testing on the test article accounting for damage accumulation in flap and edge bending for a variable, adaptively controlled, number of stress cycles, the fatigue testing being performed over a load history time series free of accurate control over each load cycle and over phase angle through fuzzy-logic control of the controller such that the accumulated damage at the end of the test is controlled.

11. A method of fatigue testing a wind turbine blade in a test system, comprising:
supporting a root end of the blade;
applying a first external load to the blade in about the flapwise direction; and
applying a second external load to the blade in about the edgewise direction, wherein the first and second external loads are imparted to the blade by using an oscillating mass attached to a single actuator assembly whereby the actuator assembly is not attached to a ground plane and configured to move the oscillating mass in both the flapwise and edgewise directions, wherein the first and second external loads are imparted in response to an oscillating frequency comprising the flapwise and edgewise resonant frequencies and wherein the actuator assembly operates in response to a first set and second set of displacement signals received at the flapwise resonant frequency and the edgewise resonant frequency, respectively, wherein the first set of displacement signals includes a first amplitude and wherein the second set of displacement signals includes a second amplitude differing from the first amplitude.

12. The method of claim 11, wherein the first and second external loads are applied to the blade at a common blade station.

13. The method of claim 11, wherein bending moments in at least one of the edgewise or flapwise directions vary during performance of the fatigue testing method and remain within a predefined load envelope.

14. A dual-axis resonant test system for fatigue testing a wind turbine blade, comprising:
a controller transmitting first displacement signals with a first amplitude at a resonant frequency of the wind turbine blade determined in a flapwise direction and second displacement signals with a second amplitude at a resonant frequency of the wind turbine blade determined in an edgewise direction;
an actuator assembly mounted on the wind turbine blade signals and not attached to a ground plane, the actuator assembly comprising a flapwise actuator and an edgewise actuator, wherein the flapwise actuator oscillates the wind turbine blade in the flapwise direction in response to the first displacement; and
the edgewise actuator oscillates the wind turbine blade in the edgewise direction in response to the second displacement signals, wherein the first amplitude differs from the second amplitude and the resonant frequencies differ from each other and wherein the flapwise and edgewise actuators are operated substantially concurrently to oscillate the wind turbine blade simultaneously in the flapwise and edgewise directions and mounted at a single blade station that is spaced apart from a root of the wind turbine blade, the root being semi-rigidly attached to a test stand and not attached to a ground plane.

15. The system of claim 14, further comprising sensors on the wind turbine blade transmitting blade response signals to the controller in response to the oscillating of the wind turbine blade.

16. The system of claim 14, wherein the controller operates to determine bending moments for the wind turbine blade in both the flapwise direction and the edgewise direction by processing the blade response signals and, in response to the determined bending moments, to selectively adjust the first and second amplitudes.

17. The system of claim 16, wherein the determined bending moments vary over a range of flapwise bending moments and over a range of edgewise bending moments during the oscillating, whereby applied loads and corresponding displacements are allowed to vary within a predefined load envelope during fatigue testing of the wind turbine blade.

* * * * *